(12) United States Patent
Hashimoto et al.

(10) Patent No.: US 8,136,295 B2
(45) Date of Patent: Mar. 20, 2012

(54) PLANT-CULTURING TOOL (75) Inventors: Masaki Hashimoto, Ibaraki (JP);
Katsuro Miyagawa, Takatsuki (JP);
Masayuki Saito, Ibaraki (JP)

(73) Assignee: Suntory Holdings Limited, Osaka-shi, Osaka (JP)

( * ) Notice: Subject to any disclaimer, the term of this patent is extended or adjusted under 35 U.S.C. 154(b) by 584 days.

(21) Appl. No.: 12/084,282

(22) PCT Filed: Oct. 30, 2006

(86) PCT No.: PCT/JP2006/321665
§ 371 (c)(1),
(2), (4) Date: Mar. 13, 2009

(87) PCT Pub. No.: WO2007/052610
PCT Pub. Date: May 10, 2007

(65) Prior Publication Data
US 2009/0313892 A1    Dec. 24, 2009

(30) Foreign Application Priority Data
Oct. 31, 2005 (JP) .................................. 2005-316855

(51) Int. Cl.
*A01G 25/00* (2006.01)

(52) U.S. Cl. ......................................................... 47/79
(58) Field of Classification Search ................ 47/79, 81, 47/48.5, 65.7
See application file for complete search history.

(56) References Cited

FOREIGN PATENT DOCUMENTS

| EP | 1 430 769 | 6/2004 |
|---|---|---|
| JP | 52-131854 | 11/1977 |
| JP | 2004-242501 | 9/2004 |

OTHER PUBLICATIONS

International Search Report dated Nov. 28, 2006 for PCT/JP2006/321665 filed Oct. 30, 2006.

*Primary Examiner* — Monica Williams
(74) *Attorney, Agent, or Firm* — Drinker Biddle & Reath LLP (57) ABSTRACT

A plant-culturing tool comprising a planting container for accommodating a plant, and a water storage container that can accommodate the planting container in the interior of the water storage container and that can store water, a guide mechanism in which the planting container makes sliding contact with the water storage container and is guided along a floating or sinking direction thereof. The guide mechanism is composed of a long guide surface having a long sliding portion, and a short guide surface having a short sliding portion that protrudes against the long guide surface, with the two guide surfaces making slide contact each other.

4 Claims, 5 Drawing Sheets

PLANT-CULTURING TOOL

CROSS REFERENCE TO RELATED APPLICATIONS

This application is the National Stage of International Application No. PCT/JP2006/321665, filed Oct. 30, 2006, and claims benefit of Japanese Application No. 2005-316855, filed Oct. 31, 2005, both of which are herein incorporated by reference in their entirety.

TECHNICAL FIELD

The present invention relates to a plant-culturing tool composed of a planting container for accommodating a plant, and a water storage container that can accommodate the planting container in the interior of the water storage container, and that can store water. The planting container can float on the water when the plant is in the planting container, allows the planting container to float up or down, and is provided with a guide mechanism in which the planting container makes sliding contact along a floating or sinking direction in the water storage container so that the orientation of the planting container is stabilized. A water intake aperture is formed in the bottom portion of the planting container to allow water to enter from the outside to the inside of the planting container when the planting container is in a floating state inside the water storage container.

BACKGROUND ART

In this type of plant-culturing tool, a planting container for accommodating a plant floats on the water for cultivating a plant inside the water storage container. In this kind of plant-culturing tool, the amount that the planting container sinks in the water for cultivation automatically increases and a quantity of water commensurate to the growth of the plant is supplied when the plant becomes heavy in conjunction with plant growth. Therefore, demand has grown in recent years for a plant-culturing tool that is convenient to use.

However, the orientation of the planting container becomes unstable when the plant grows and the center of gravity shifts upward because the planting container that accommodates the plant floats in water. For this reason, a plant-culturing tool is known that is provided with a guide mechanism for guiding the vertical floating movement of the planting container in relation to the water storage container, and the tool is configured so that the orientation of the planting container is maintained.

[Patent Document 1] Japanese Laid-open Patent Application No. 2004-242501

DISCLOSURE OF THE INVENTION

Problems that the Invention is Intended to Solve

Figure 1:
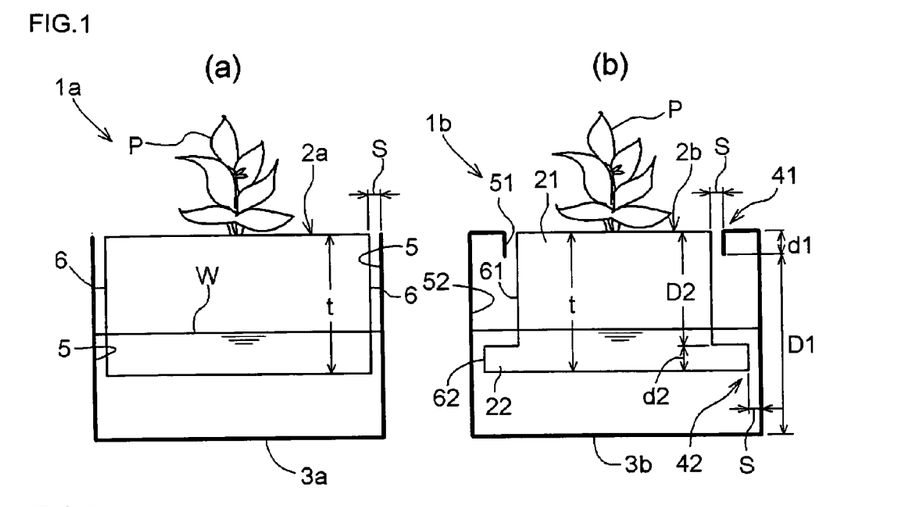
FIG. 1(a) is a lateral sectional view of a conventional plant-culturing tool.
FIG. 1(b) is a schematic lateral sectional view of the plant-culturing tool of the present invention.

However, in the plant-culturing tool disclosed in the patent document noted above, the planting container, when floating up or down in the water storage container, is configured so that the external peripheral surface of the planting container that constitutes the guide mechanism slides across the entire length of the planting container on the internal peripheral surface of the water storage container that constitutes the same guide mechanism, as shown in FIG. 1(a). In this configuration, a space must be suitably set between the external peripheral surface of the planting container and the internal peripheral surface of the water storage container because the sliding contact surface area between the external peripheral surface of the planting container and the internal peripheral surface of the water storage container is large. There is a problem in that there is a low degree of freedom in selecting the shape of the planting container and water storage container. In other words, friction increases when the space is narrow, the planting container does not smoothly float up and down, and, in extreme cases, the external peripheral surface of the planting container will adhere to the internal peripheral surface of the water storage container, and there is a risk that the vertical floating movement of the planting container will not proceed smoothly. Conversely, the planting container is held in an unstable orientation when the space is excessively wide. When an attempt is made to reduce the height of the planting container to minimize the sliding surface area, the plant accommodation space of the planting container is also reduced, the size of the plant accommodated in the planting container is limited, and usefulness of the tool is compromised.

In view of the foregoing, an object of the present invention is to provide a plant-culturing tool in which the planting container has smooth floating movement up or down in the water storage container and which can maintain the stability of the orientation of the planting container without providing a particularly large space between the planting container and the water storage container, or without using a planting container with a reduced height.

Means for Solving the Problems

The first aspect of the present invention is a plant-culturing tool comprising: a planting container for accommodating a plant; a water storage container that is capable of accommodating the planting container in an interior thereof and that can store waters the planting container can float on the water when the plant is in the planting container; and a guide mechanism for causing the planting container to make sliding contact with the water storage container along a floating or sinking direction thereof, so that the planting container is allowed to float up or down, and that the orientation thereof is stabilized, a water intake aperture being formed in the bottom portion of the planting container to allow water to be drawn from the outside to the inside of the planting container when the planting container is in a floating state inside the water storage container, the plant-culturing tool characterized in that the guide mechanism is composed of a long guide surface having a long sliding portion, and a short guide surface having short sliding portion that protrudes against the long guide surface, the surfaces making sliding contact with each other; that the short guide surface and the long guide surface are distributed to the planting container and the water storage container respectively and to face each other; and that the guide mechanism is provided at least on an upper part and a lower part of the planting container and the water storage container.

Function and Effect of the Invention

In this aspect, the guide mechanism is composed of a long guide surface having a long sliding portion, and a short guide surface having a short sliding portion that protrudes with respect to the long guide surface, with the surfaces making sliding contact with each other. The short guide surface and the long guide surface are disposed on the planting container and the water storage container, respectively, and are disposed so as to face each other in a position in which the two make sliding contact with each other. In comparison with the plant-culturing tool described in the publication noted above, the surface area of the sliding contact parts (the parts in which the guide surfaces are provided to the planting container and water storage container and which can make sliding contact against each other) can be reduced by adopting such a configuration. As a result, friction that may be produced between the two guide surfaces as the planting container floats up or down in the water storage container can be reduced. In this way, the planting container can be made to float smoothly up or down in the water storage container without providing a particularly large space between the planting container and the water storage container, or without using a planting container with a reduced height.

At least the upper part and the lower part of the planting container are simultaneously guided by the water storage container because the guide mechanism is provided at least on the upper parts and lower parts of the planting container and the water storage container. The two guide mechanisms thereby reduce tilting in relation to the horizontal direction of the planting container and stably maintain the orientation of the planting container even when, e.g., the plant in the planting container grows and the center of gravity of the planting container shifts upward or downward, or when a plant swings sideward due to strong winds.

Here, function and effect of the present invention will be described in greater detail with reference to the drawings.

FIG. 1(a) is a schematic lateral sectional view of a conventional plant-culturing tool 1a described in the publication noted above. FIG. 1(b) is a schematic lateral sectional view of a plant-culturing tool 1b of the present invention.

In FIG. 1(a), the plant-culturing tool 1a is a conventional plant-culturing tool described in the above patent document. The tool is composed of a plant container 2a for accommodating a plant P, and a water storage container 3a that for accommodating the planting container 2a and storing storage water W for plant cultivation. The planting container 2a floats on storage water (W) with its external peripheral surface 6 (height: t) being slidably guided in contact with an interior peripheral surface 5 of the water storage container 3a, so as to allow the planting container to float up or down and to stabilize the orientation of the planting container. Incidentally, the water storage container 3a and the planting container 2a are cylindrically shaped and are provided with a space (S) between the internal peripheral surface 5 of the water storage container 3a and the external peripheral surface 6 of the planting container 2a.

In FIG. 1(b), the plant-culturing tool 1b is a plant-culturing tool showing an example of the present invention. The tool is composed of a plant container 2b for accommodating a plant P, and a water storage container 3b that can accommodate the planting container 2b and store storage water W for plant cultivation.

The water storage container 3b has an external appearance that is substantially similar to the cylindrical shape of the water storage container 3a described above, and an interior having an upper internal peripheral surface 51 that constitutes a short guide surface (height d1), and a lower internal peripheral surface 52 that constitutes a long guide surface (height D1) (d1<D1).

The planting container 2b has a convex cylindrical shape that is composed of an upper external peripheral part 21 having an external peripheral surface 61 (height D2) as a long guide surface, and a lower external peripheral part 22 having a lower external peripheral surface 62 (height d2) as a short guide surface (d2<D2), and has the same height t as the conventional planting container 2a described above (t=D2+d2).

In other words, the guide mechanism provided to the upper portion of the plant-culturing tool 1b is composed of the upper internal peripheral surface 51 and the upper external peripheral surface 61; and the guide mechanism provided to the lower portion is composed of the lower internal peripheral surface 52 and the lower portion peripheral surface 62.

A space (S) that is the same size as in the conventional plant-culturing tool 1a is provided between the upper internal peripheral surface 51 of the water storage container 3b and the upper external peripheral surface 61 of the planting container 2b, and between the lower internal peripheral surface 52 of the water storage container 3b and the lower external peripheral surface 62 of the planting container 2b.

The parts between the planting container 2a and the water storage container 3a that can make constant sliding contact in the conventional plant-culturing tool 1a extend the entire length (t) of the external peripheral surface 6 of the planting container 2a, as shown in FIG. 1(a). In contrast, the sliding parts between the planting container 2b and the water storage container 3b in the plant-culturing tool 1b of the present invention shown in FIG. 1(b) are only the upper internal peripheral surface 51 (height d1) and the lower external peripheral surface 62 (height d2) which are the short guide surfaces. For this reason, in the plant-culturing tool 1b of the present invention, the up and down movement of the planting container in the water storage container can be made smooth even without providing a wider space between the water storage container and the planting container, or using a planting container having a reduced height, since the sliding contact surface area is reduced when the planting container floats up and down in the water storage container in comparison with the conventional plant-culturing tool 1a, and the friction that can be generated between mutual guide surfaces can be reduced (∵ t>d1+d2).

Furthermore, since the guide mechanism is provided to the upper and lower parts of the planting container 2b and the water storage container 3b, the upper and lower parts of the planting container 2b are simultaneously guided by the water storage container 3b, and the orientation of the planting container 2b is stably maintained even when the plant P inside the planting container 2b grows and the center of gravity of the planting container 2b shifts upward or downward.

The second aspect of the present invention is the plant-culturing tool of the first aspect, characterized by, a cover member that covers an upper surface of the water storage unit is provided, said cover member having an opening part that allows a peripheral edge of an upper part of the planting container to be inserted in accordance with the floating and sinking movement of the planting container;

a first guide mechanism in which an internal peripheral surface of said opening part is the short guide surface, and in which an external peripheral surface of an upper portion of the planting container is the long guide surface; and a second guide mechanism in which an external peripheral part of a lower portion of the planting container is the short guide surface, and in which an internal peripheral surface of a lower portion of the water storage container is the long guide surface.

Function and Effect of the Invention

In the present invention, algae or the like is less likely to grow in the water inside the water storage container due to a light-shielding effect because the top surface of the water storage container is covered by a covering member, and the water in the water storage container stays clean because unwanted matter is prevented from entering.

Also, an extreme increase or reduction in water temperature can be prevented and better development of the plant can be promoted because the insulation effects of the plant-culturing tool of the present invention can be further enhanced by the cover member. Furthermore, a reduction in water evaporation from the water storage container is also possible, and a water conservation effect can also be expected.

The third aspect of the present invention is the plant-culturing tool of the first or second aspect, characterized in that the short guide surface or the long guide surface is formed by protruding ribs.

Function and Effect of the Invention

Since protruding ribs form the short guide surfaces or the long guide surfaces in required locations in order to guide the planting container, more water can be stored inside the water storage container, for example, in comparison with water storage containers that have a guide surface that juts out over the entire longitudinal direction of the water storage container. In this way, the work of replenishing water to the water storage container can be facilitated. Furthermore, by the increase in the quantity of storage water, the insulating effect can be further increased in the plant-culturing tool of the present invention, an extreme increase or reduction in water temperature can be prevented, and better development of the plant can be promoted.

EXPLANATION FOR THE REFERENCE NUMBERS

1 Plant-culturing tool
2 Planting container
21 Upper external peripheral part
22 Lower external peripheral part
3 Water storage container
41 First guide mechanism
42 Second guide mechanism
5 Internal peripheral surface
51 Upper internal peripheral surface (internal peripheral surface of the opening part)
52 Lower internal peripheral surface
6 External peripheral surface
61 Upper external peripheral surface
62 Lower external peripheral surface
7 Planting material
8 Water intake aperture
9 Accommodation space
10 Cover member
11 Opening part
12 Rib
12a Upper guide rib
12b Lower guide rib
P Plant
W Water

BEST MODE FOR CARRYING OUT THE INVENTION

Next, embodiments of the present invention will be described with reference to the diagrams.

Embodiments

A plant-culturing tool 1 of the present invention is used to culture a plant while keeping a planting container 2 to float on water. The tool is composed of the planting container 2 and a water storage container 3.

Figure 2:
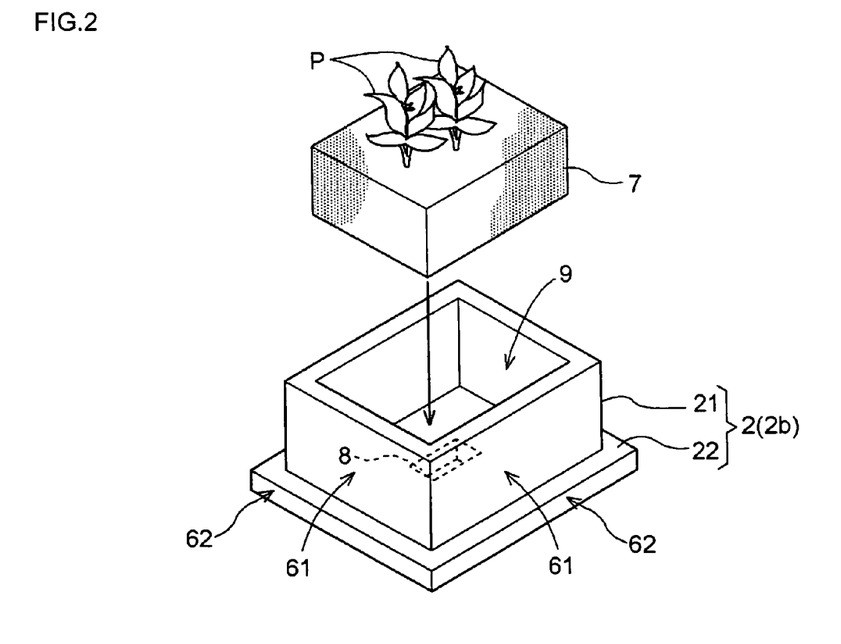
FIG. 2 is a perspective view of a planting container in the plant-culturing tool of the present invention.

FIG. 2 is a perspective view of the planting container 2 in the plant-culturing tool 1 of the present invention. The planting container 2 has a box shape with its upper portion composed of an upper external peripheral part 21 and its bottom portion composed of a lower external peripheral part 22. The interior portion of the planting container is provided with an accommodation space 9 that can accommodate planting material 7, as shown in FIG. 2. A water intake aperture 8 through which water can flow in is provided in the bottom part (lower external peripheral part 22).

The planting container 2 is molded from, e.g., polystyrene foam, which has a lower specific gravity than water, so as to allow the container to float on storage water W in a state in which planting material 7 is accommodated. The planting material 7 can be any solid medium that can be used in gardening plant husbandry, and the following examples may naturally be used without limitation: Akadama soil, Kanuma soil, leaf mould, peat moss, bog moss, and other natural plant cultivation, and soils. However, it is also possible to use vermiculite, perlite, urethane resin, phenol resin and other assorted foamed resin materials; and rock wool, water absorbing polymer beads, and other artificial plant cultivation soils. The shape of the planting material is not limited to a block shape as shown in the drawing, and it is also possible to suitably select and use sandy forms, granular forms, block forms, and other assorted forms. In this case, these culture media can be used by being placed in netted bags or the like so as not to leak out of the planting container 2 when sandy forms, granular forms, block forms, and other shapes are used.

Figure 3:
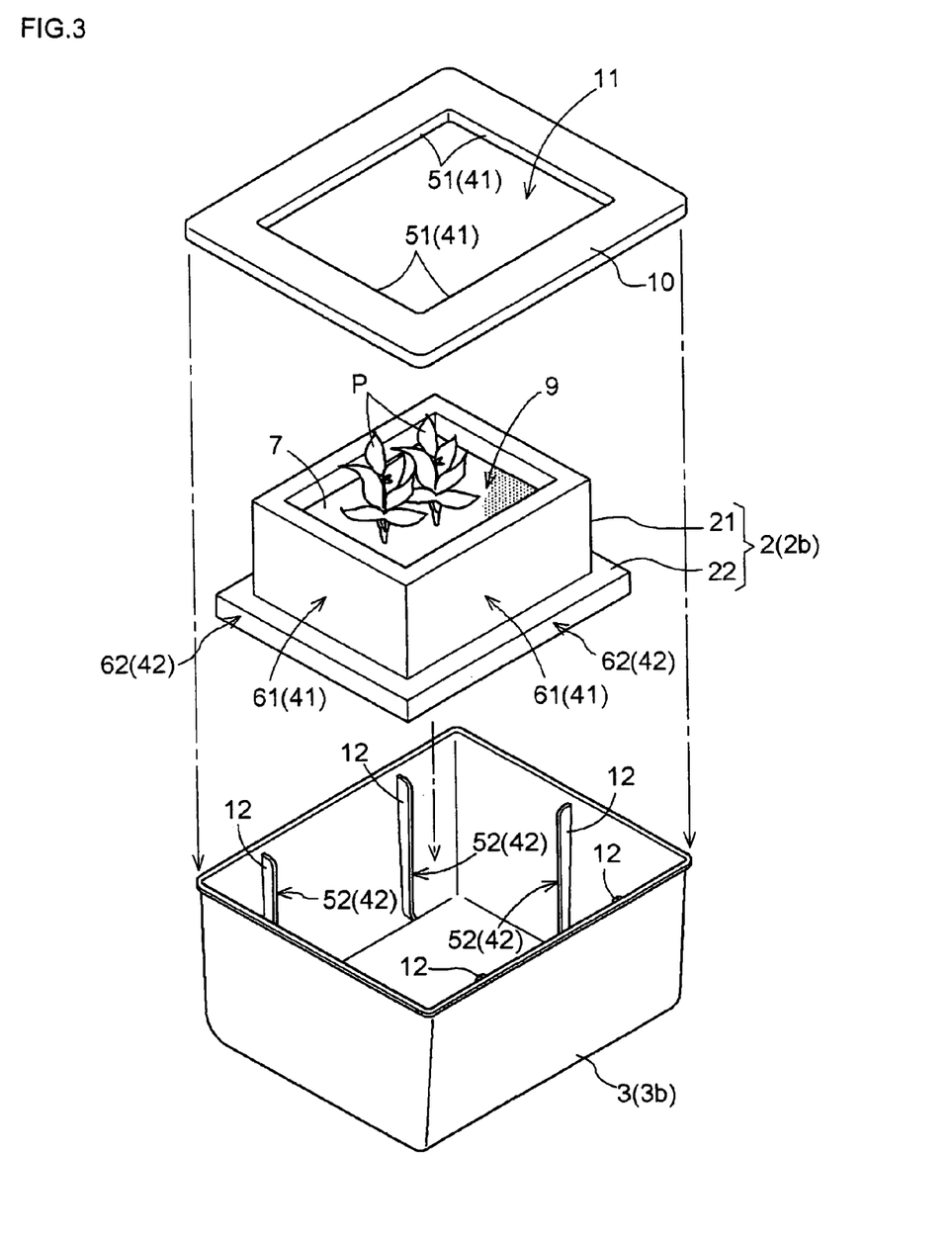
FIG. 3 is an exploded perspective view of the plant-culturing tool of the present invention.

FIG. 3 is an exploded perspective view of the plant-culturing tool 1 of the present invention. The water storage container 3 has a box shape and is configured so that the planting container 2 can float on storage water W when storage water W for plant cultivation and the planting container 2 (containing planting material 7 in which a plant P is planted) are placed inside the water storage container. A plurality of ribs 12 is disposed in a protruding fashion on the inside of the water storage container 3 in the internal peripheral part of the lower portion.

A cover member 10 is configured to detachably fit over the upper portion of the water storage container 3 so as to cover this portion. When storage water W in the water storage container 3 is decreased, the cover member 10 is removed and an appropriate amount of water can be added inside the water storage container 3. An opening part 11 disposed inside the cover member is configured so that a peripheral edge of the upper external peripheral part 21 of the planting container can be inserted in accordance with the floating movement of the planting container 2.

The shape of the planting container 2 and the water storage container 3 are not limited to the box shape described above. For example, a cylindrical shape or any other shape may be adopted as required as long as the present invention can be implemented.

Figure 4:
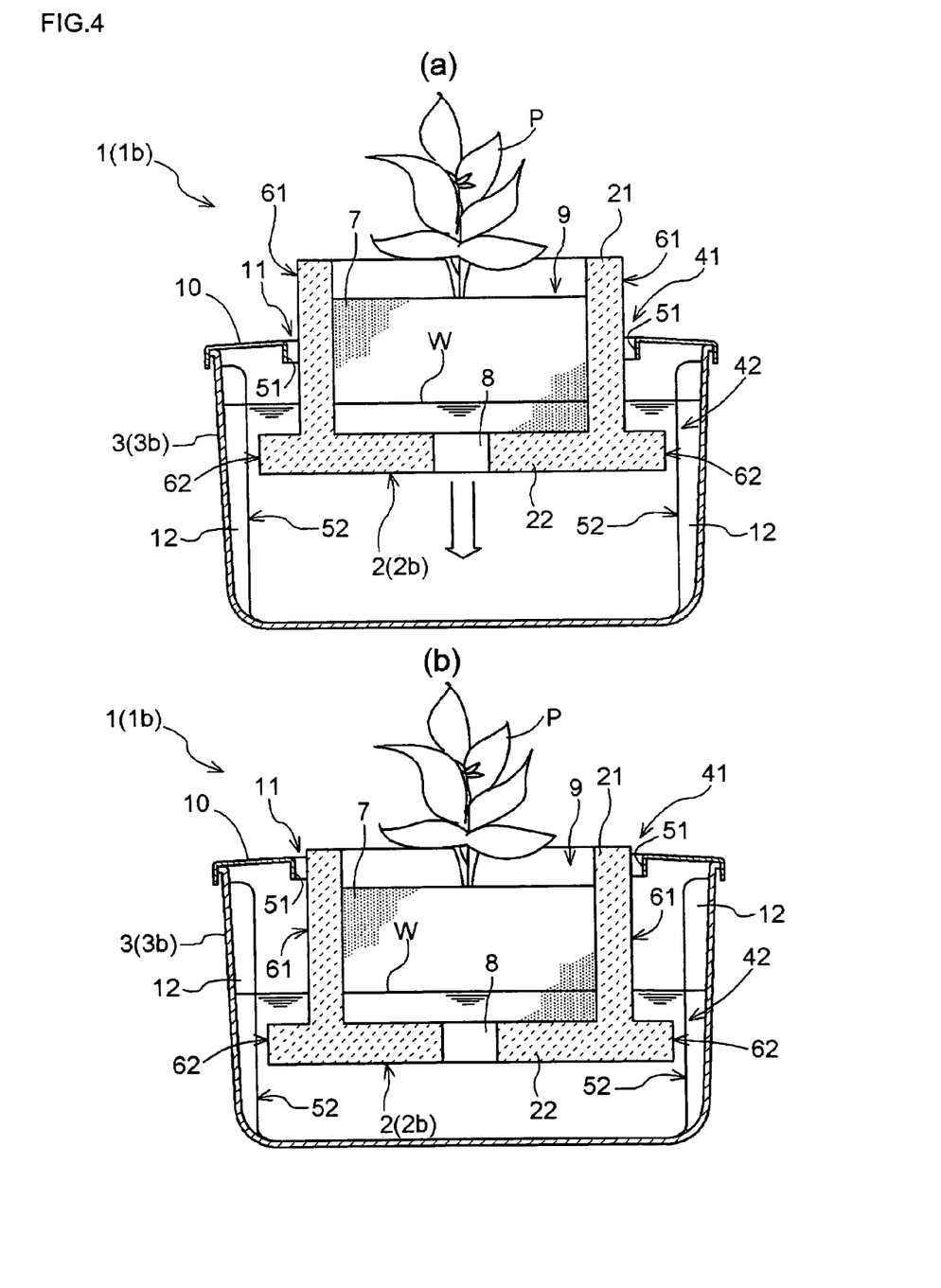
FIG. 4 is a lateral sectional view showing the appearance when the plant-culturing tool of the present invention is used.

FIG. 4 is a lateral sectional view showing the appearance when the plant-culturing tool 1 of the present invention is used.

The planting container 2 shows a floating with a part of the upper external peripheral part 21 of the planting container 2 protruding from the opening part 11, and in a state partially immersed under the storage water W. Storage water W in the water storage container 3 flows into an accommodation space 9 via a water intake aperture 8, and the planting material 7 thus accommodated is soaked in the supplied storage water W. As a result, the plant P in the planting material 7 is supplied with water, and plant growth can be sustained and accelerated.

In the present invention, a set amount of water can be constantly supplied to the planting material 7 because the distance that the planting container 2 sinks does not change as long as the weight of the planting container 2 does not change even if storage water W is decreased due to, e.g., evaporation or other factors, as shown in FIGS. 4(a) and (b).

The plant P will require more water commensurate with plant growth if the plant P has grown and become large, although this is not depicted in the drawings.

In the present invention, the distance that the planting container 2 sinks into the storage water W will increase when the overall weight of the planting container 2 increases in accordance with the growth of the plant P. More water will thereby flow into accommodation space 9, and an amount of water commensurate with the growth of plant P can be automatically provided as needed to the planting material 7 (plant P).

Next, the guide mechanism of the plant-culturing tool 1 of the present invention will be described.

The planting container 2 is slidably guided by a first guide mechanism 41 composed of an internal peripheral surface 51 (short guide surface) of the opening part 11 of the cover member, and further composed of an upper external peripheral surface 61 (long guide surface) of the planting container 2; and by a second guide mechanism 42 composed of a guide surface (long guide surface) of ribs 12 that are disposed in a protruding fashion on a lower internal peripheral part of the water storage container 3, and further composed of a lower external peripheral surface 62 (short guide surface) of the planting container 2. The orientation of the planting container 2 is thereby stabilized.

Therefore, the planting container 2 can smoothly descend in a state in which the orientation of the planting container is properly maintained inside the water storage container 3 when the plant P grows and the overall weight of the planting container 2 increases, or when the storage water W is decreased.

On the other hand, if the overall weight of planting container 2 is reduced in accordance with falling leaves or the like of the plant P, the distance that the planting container 2 sinks into the storage water W lessens and the planting container 2 floats at more upward level. In this case as well, the planting container 2 is slidably guided in a similar fashion by the first guide mechanism 41 and the second guide mechanism 42, and can rise smoothly in a state in which the orientation of the planting container is properly maintained inside the water storage container 3.

Another Embodiment

Figure 5:
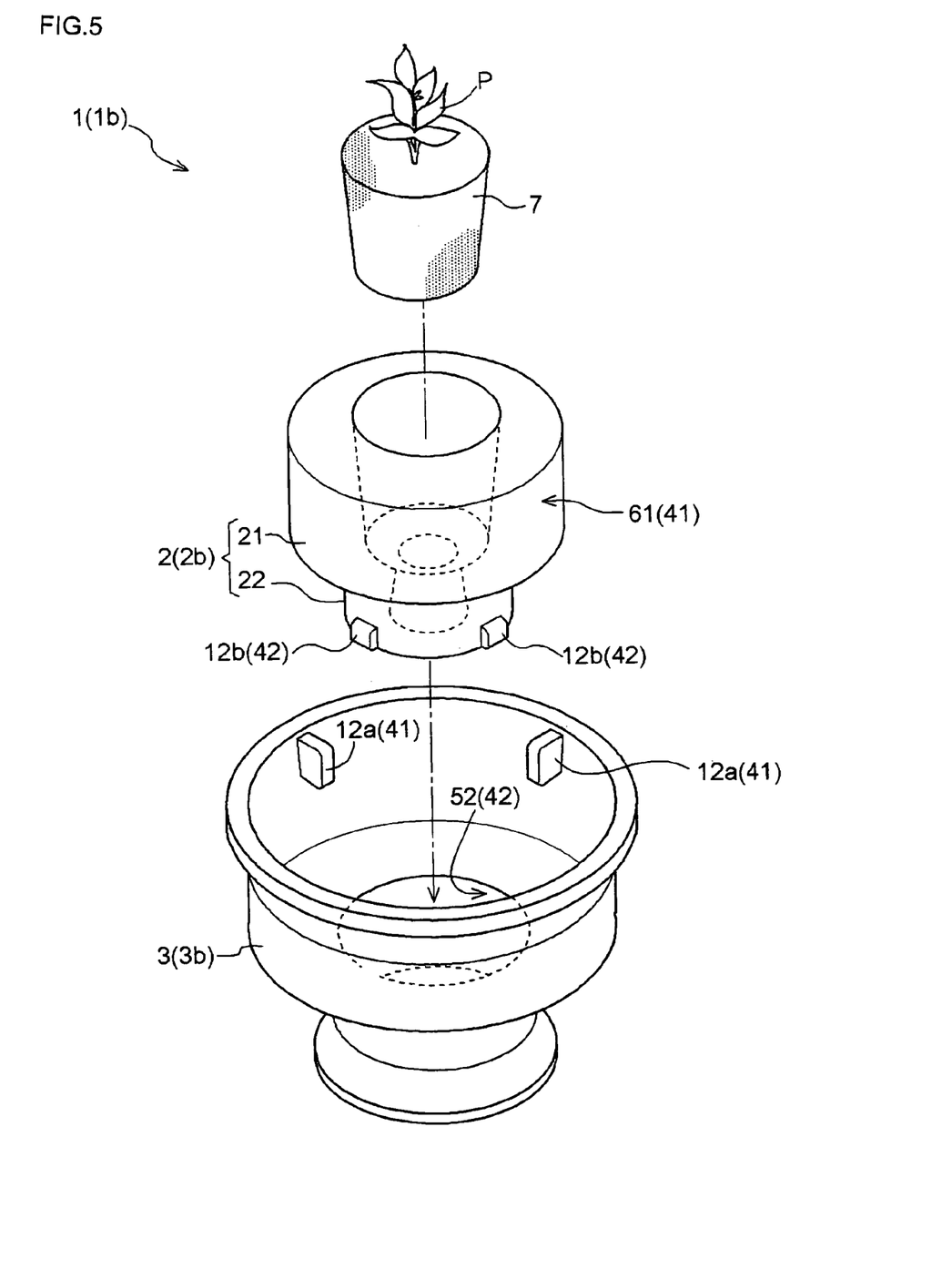
FIG. 5 is an exploded perspective view of the plant-culturing tool in another embodiment of the present invention.
Figure 6:
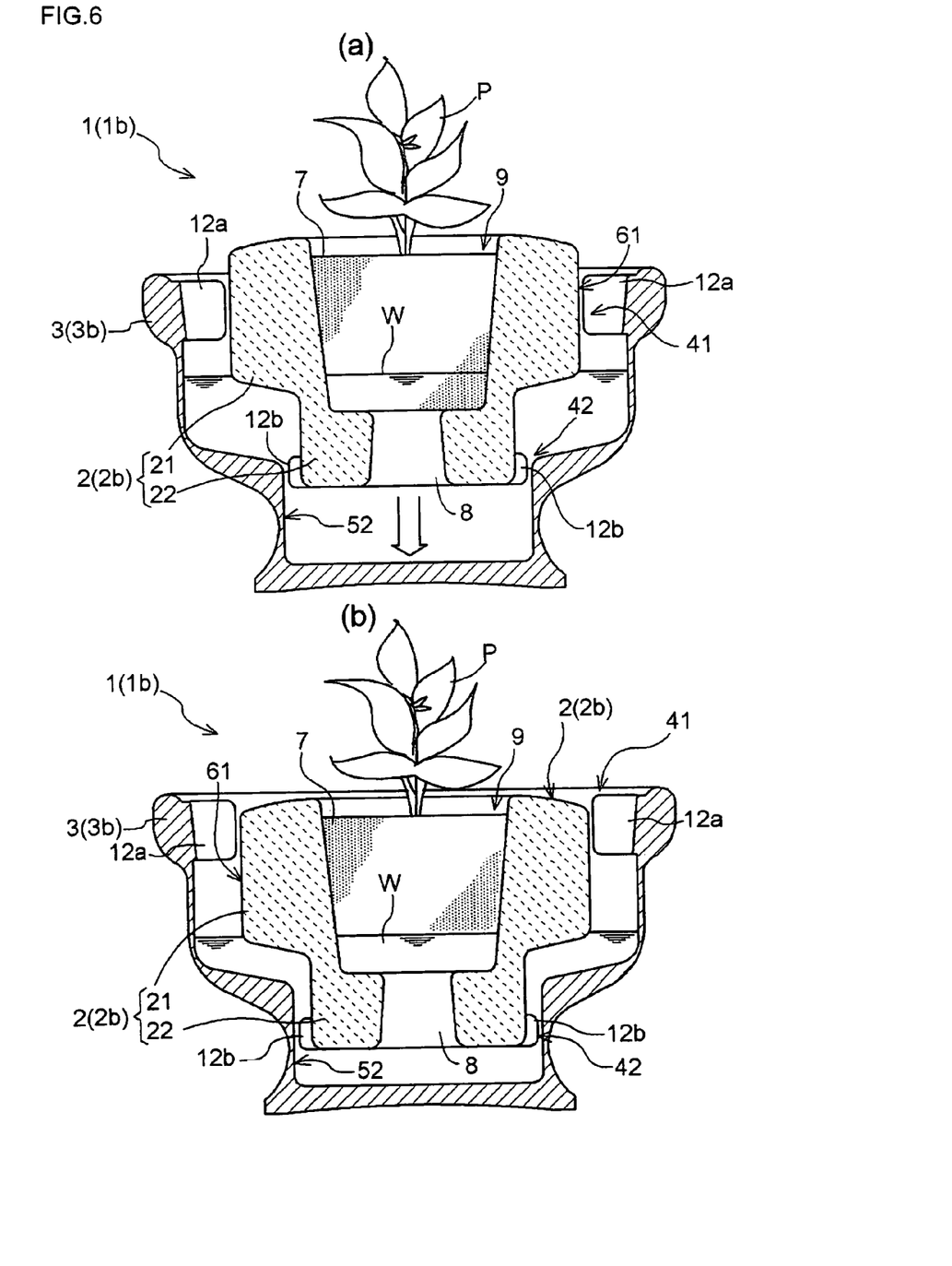
FIG. 6 is a lateral sectional view showing the appearance when the plant-culturing tool according to another embodiment of the present invention is used.

FIGS. 5 and 6 show a separate embodiment of the present invention. A description of the constituent members described in the previous embodiment and constituent members that have the same function will be omitted by using the same reference numerals so as to avoid redundant descriptions, and a configuration that differs from the previous embodiment will mainly be described.

In another embodiment of the present invention, the shape of the planting container 2 is a reverse convex cylindrical shape, and the lower guide ribs 12b are disposed in a protruding fashion on a lower external peripheral part 22. The shape of the water storage container 3 is also a reverse convex cylindrical shape, and a plurality of upper guide ribs 12a is disposed in a protruding fashion on an upper internal peripheral part of the water storage container.

As shown in FIGS. 6(a) and 6(b), in this other embodiment as well, a set amount of water can always be supplied to the planting material 7 (plant P) even if storage water W is decreased due to, e.g., evaporation or other factors. More water will thereby flow into the accommodation space 9, and an amount of water commensurate with the growth of plant P can be automatically provided as needed to the planting material 7 (plant P) even when the plant P has grown and become large.

In this embodiment, the first guide mechanism 41 is composed of an upper external peripheral surface 61 (long guide surface) of the planting container 2, and guide surfaces (short guide surfaces) of an upper guide ribs 12a of the water storage container 3. The second guide mechanism 42 is composed of the guide surfaces (short guide surface) of the lower guide ribs 12b of the planting container 2, and the lower internal peripheral surface 52 (long guide surface) of the water storage container 3.

Therefore, in this embodiment as well, in the same manner as the embodiment described above, the planting container 2 is slidably guided by two, i.e., upper and lower guide mechanisms (the first guide mechanism 41 and the second guide mechanism 42). For this reason, the orientation of the planting container 2 is stabilized and can smoothly descend (or ascend) inside the water storage container 3.

Other Embodiments

1. The short guide surfaces and the long guide surfaces constituting the guide mechanism are not limited to the embodiments described above. For example, in the case that the short guide surfaces are ribs and the long guide surface is the internal peripheral surface of the water storage tank in the second guide mechanism, the short guide surface or the long guide surface in the first guide mechanism may be composed of ribs, and the other guide surface may be configured as the internal peripheral surface of the water storage container or the external peripheral surface of the planting container.

2. The number and position of guide mechanisms that are provided to the plant-culturing tool of the present invention are not limited to the embodiments described above, in which the guide mechanisms are provided in two locations, i.e., the upper and lower portions of the planting container and the water storage container. It is possible to embody with the configuration in which, e.g., the guide mechanisms are disposed also in the center portion of the planting container and water storage container, or a desired more than two number of guide mechanisms may suitably be disposed in desired positions as needed.

The invention claimed is:

1. A plant-culturing tool comprising: a planting container for accommodating a plant;

a water storage container that is capable of accommodating the planting container in an interior thereof and that can store water the planting container can float on the water when the plant is in the planting container;

and a guide mechanism for causing the planting container to make sliding contact with the water storage container along a floating or sinking direction thereof, so that the planting container is allowed to float up or down, and that the orientation thereof is stabilized, a water intake aperture being formed in the bottom portion of the planting container to allow water to be drawn from the outside, to the inside of the planting container when the planting container is in a floating state inside the water storage container, the plant-culturing tool characterized in that:

the guide mechanism is composed of a long guide surface having a long sliding portion, and a short guide surface having a short sliding portion that protrudes against the long guide surface, the surfaces making sliding contact with each other; that the short guide surface and the long guide surface are distributed to the planting container and the water storage container respectively and to face each other; and that the guide mechanism is provided at least on an upper part and a lower part of the planting container and the water storage container, wherein each short sliding portion has a length that is less than its corresponding long sliding portion so as to reduce friction that may be produced between two guide surfaces.

2. The plant-culturing tool according to claim 1 characterized by, a cover member that covers an upper surface of the water storage unit is provided, said cover member having an opening part that allows a peripheral edge of an upper part of the planting container to be inserted in accordance with the floating and sinking movement of the planting container;

a first guide mechanism in which an internal peripheral surface of said opening part is the short guide surface, and in which an external peripheral surface of an upper portion of the planting container is the long guide surface; and a second guide mechanism in which an external peripheral part of a lower portion of the planting container is the short guide surface, and in which an internal peripheral surface of a lower portion of the water storage container is the long guide surface.

3. The plant-culturing tool according to claim 2 characterized in that the short guide surface or the long guide surface is formed by protruding ribs.

4. The plant-culturing tool according to claim 1 characterized in that the short guide surface or the long guide surface is formed by protruding ribs.

* * * * *